(12) United States Patent
Strba et al.

(10) Patent No.: US 12,431,029 B2
(45) Date of Patent: Sep. 30, 2025

(54) ADJUSTABLE SYSTEM FOR DISPLAYING NOTIFICATION ITEMS FOR URBAN AIR MOBILITY GROUND STATION HMI

(71) Applicant: HONEYWELL INTERNATIONAL INC., Charlotte, NC (US)

(72) Inventors: Miroslav Strba, Brno (CZ); Tomas Bouda, Brno (CZ); Eva Josth Adamova, Brno (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 248 days.

(21) Appl. No.: 18/186,623

(22) Filed: Mar. 20, 2023

(65) Prior Publication Data

US 2024/0321119 A1    Sep. 26, 2024

(51) Int. Cl.
| | |
|---|---|
| *G08G 5/56* | (2025.01) |
| *G08G 5/22* | (2025.01) |
| *B64U 10/00* | (2023.01) |
| *G06F 3/0482* | (2013.01) |
| *G06F 3/04847* | (2022.01) |

(52) U.S. Cl.
CPC .......... *G08G 5/56* (2025.01); *G08G 5/22* (2025.01); *B64U 10/00* (2023.01); *G06F 3/0482* (2013.01); *G06F 3/04847* (2013.01)

(58) Field of Classification Search
CPC .................................. G08G 5/22; G08G 5/56
See application file for complete search history.

(56) References Cited

U.S. PATENT DOCUMENTS

| | | | |
|---|---|---|---|
| 8,095,107 B2 | 1/2012 | O'Neill et al. | |
| 8,701,027 B2 | 4/2014 | Van Dantzich et al. | |
| 9,457,914 B1 | 10/2016 | Cline et al. | |
| 9,558,669 B2 | 1/2017 | Whitlow et al. | |
| 9,745,077 B1 | 8/2017 | Lentz et al. | |
| 2003/0046421 A1* | 3/2003 | Horvitz | G06Q 30/02 709/206 |
| 2015/0356873 A1* | 12/2015 | Kneuper | G06T 11/206 701/439 |

(Continued)

FOREIGN PATENT DOCUMENTS

| | | |
|---|---|---|
| EP | 4002326 A1 | 5/2022 |
| EP | 4050586 A1 | 8/2022 |

*Primary Examiner* — Seth A Silverman
(74) *Attorney, Agent, or Firm* — Ingrassia Fisher & Lorenz, LLP

(57) ABSTRACT

A display system for a UAM ground control station HMI, may include an HMI device and a controller for generating a graphical user interface (GUI) window for displaying notification items on the HMI device. The controller is configured to: receive a plurality of notification items for display at a UAM ground control station via the HMI device, provide, via a GUI widget displayed on the HMI device, a plurality of display prioritization options for identifying a different subset of the notification items for display in a notification item GUI window, receive selection via the GUI widget of a user-selected display prioritization option from the plurality of user-selectable display prioritization options, select a first set of notification items from the plurality of notification items for display based on the user-selected display prioritization option; and display the first set of notification items in the notification item GUI window on the HMI device.

20 Claims, 6 Drawing Sheets

(56) References Cited

U.S. PATENT DOCUMENTS

| | | | |
|---|---|---|---|
| 2020/0168104 A1* | 5/2020 | Holder | G08G 5/58 |
| 2020/0168107 A1* | 5/2020 | Heine | G08G 5/55 |
| 2020/0410875 A1* | 12/2020 | Kalyan | G08G 5/34 |
| 2022/0035367 A1 | 2/2022 | Ho et al. | |
| 2022/0284823 A1 | 9/2022 | Felix et al. | |
| 2022/0406200 A1 | 12/2022 | Bush et al. | |

* cited by examiner

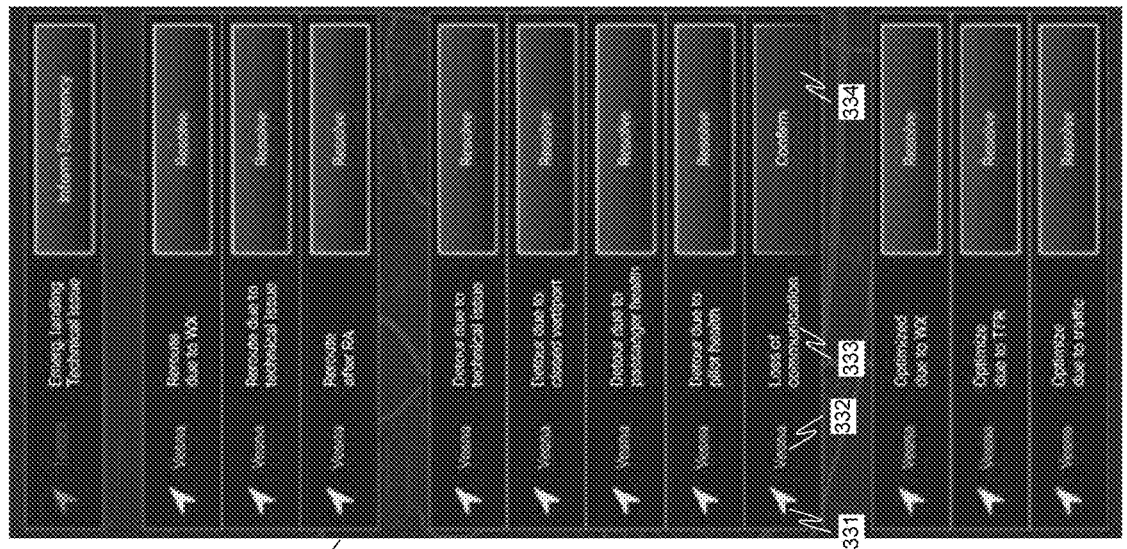
FIG. 3C
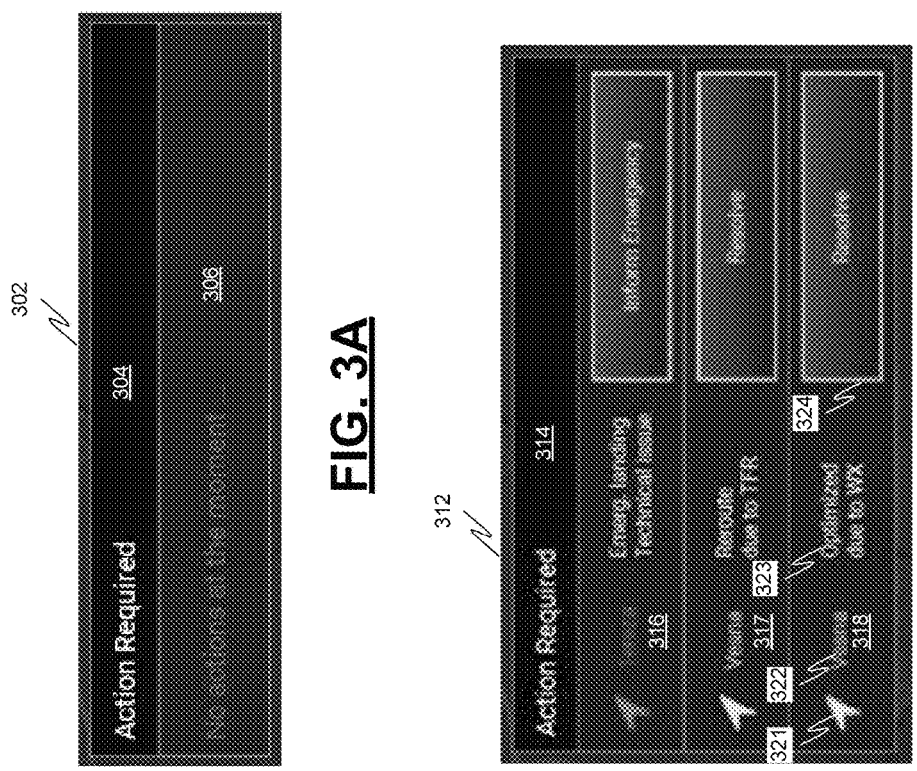
FIG. 3A
FIG. 3B

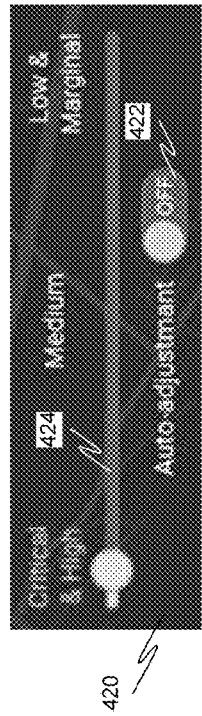
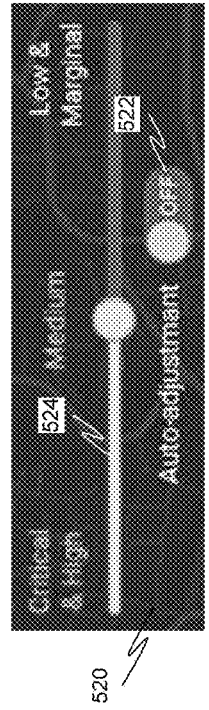
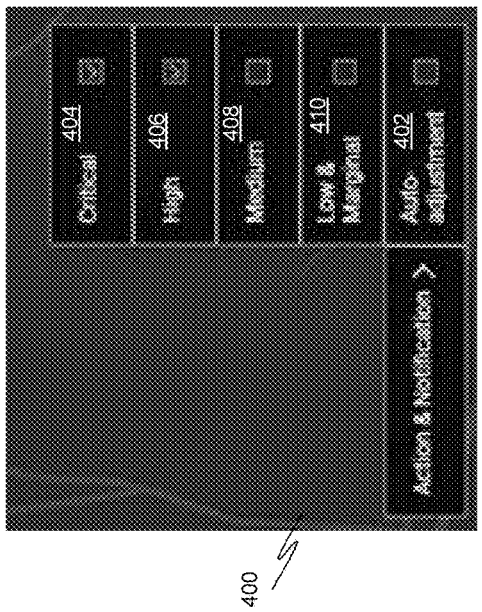
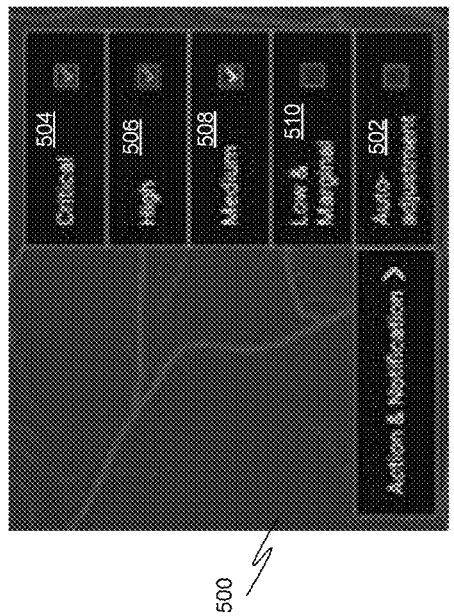
FIG. 4B
FIG. 5B
FIG. 4A
FIG. 5A

ADJUSTABLE SYSTEM FOR DISPLAYING NOTIFICATION ITEMS FOR URBAN AIR MOBILITY GROUND STATION HMI

TECHNICAL FIELD

The technical field generally relates to urban air mobility ground stations, and more particularly relates to systems and methods for controlling the display of notification items on urban air mobility ground stations.

BACKGROUND

An Urban Air Mobility (UAM) system is an aviation transportation system that uses highly automated aircraft that operate and transport passengers or cargo at lower altitudes within urban and suburban areas. The highly automated aircraft can include unmanned vehicles. Ground tools are needed to manage the unmanned vehicles.

Hence, it is desirable to provide systems and methods for assisting with managing the unmanned vehicles. Furthermore, other desirable features and characteristics of the present invention will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In some aspects, the techniques described herein relate to a notification item display system for an Urban Air Mobility (UAM) ground station, the system including: a human machine interface (HMI) device having at least one display unit and at least one user input mechanism; and a controller for generating a graphical user interface (GUI) window for displaying notification items on the HMI device, wherein a notification item includes a message from an Unmanned Aircraft System Traffic Management (UTM) service provider, a UAM vehicle, an air traffic control (ATC) service provider, a vertiport, a fleet scheduler, an integrated map provider, or a weather service provider related to air travel in an airspace, the controller is configured to: receive a plurality of notification items for display to a ground operator at a UAM ground control station via the HMI device, while the ground operator monitors a plurality of ongoing missions of autonomous or semi-autonomous aerial vehicles from the ground and makes mission-specific decisions; provide, via a GUI widget displayed on the HMI device, a plurality of display prioritization options for identifying a different subset of the notification items for display in a notification item GUI window, the plurality of display prioritization options including a plurality of user-selectable display prioritization options wherein each user-selectable display prioritization option identifies a different subset of the plurality of notification items for display in the notification item GUI window; receive selection via the GUI widget of a user-selected display prioritization option from the plurality of user-selectable display prioritization options; select a first set of notification items from the plurality of notification items for display based on the user-selected display prioritization option; and cause the first set of notification items to be displayed in the notification item GUI window on the HMI device.

In some aspects, the techniques described herein relate to a method in a relational network in an airspace including a plurality of aerial vehicles in the airspace that include a plurality of manned aerial vehicles and a plurality of unmanned aircraft systems, an air traffic control (ATC) service provider that provides air traffic control services for the plurality of manned aerial vehicles in the airspace, an Unmanned Aircraft System Traffic Management (UTM) service provider that provides traffic management services for the plurality of unmanned aircraft systems in the airspace through an Urban Air Mobility (UAM) ground control station that includes a human machine interface (HMI) device and a controller for generating a graphical user interface (GUI) window for displaying notification items on the HMI device, wherein a notification item includes a message from the UTM service provider, a UAM vehicle, the ATC service provider, a vertiport, a fleet scheduler, an integrated map provider, or a weather service provider related to air travel in an airspace, the method including: receiving a plurality of notification items for display to a ground operator at a UAM ground control station via the HMI device, while the ground operator monitors a plurality of ongoing missions of autonomous or semi-autonomous aerial vehicles from the ground and makes mission-specific decisions; providing, via a GUI widget displayed on the HMI device, a plurality of display prioritization options for identifying a different subset of the notification items for display in a notification item GUI window, the plurality of display prioritization options including a plurality of user-selectable display prioritization options wherein each user-selectable display prioritization option identifies a different subset of the plurality of notification items for display in the notification item GUI window; receiving selection via the GUI widget of a user-selected display prioritization option from the plurality of user-selectable display prioritization options; selecting a first set of notification items from the plurality of notification items for display based on the user-selected display prioritization option; and displaying the first set of notification items in the notification item GUI window on the HMI device.

In some aspects, the techniques described herein relate to a non-transitory computer-readable medium having stored thereon instructions that when executed by a processor cause the processor to perform a method in a relational network in an airspace including a plurality of aerial vehicles in the airspace that include a plurality of manned aerial vehicles and a plurality of unmanned aircraft systems, an air traffic control (ATC) service provider that provides air traffic control services for the plurality of manned aerial vehicles in the airspace, an Unmanned Aircraft System Traffic Management (UTM) service provider that provides traffic management services for the plurality of unmanned aircraft systems in the airspace through an Urban Air Mobility (UAM) ground control station that includes a human machine interface (HMI) device and a controller for generating a graphical user interface (GUI) window for displaying notification items on the HMI device, wherein a notification item includes a message from the UTM service provider, a UAM vehicle, the ATC service provider, a vertiport, a fleet scheduler, an integrated map provider, or a weather service provider related to air travel in an airspace, the method including: receiving a plurality of notification items for display to a ground operator at a UAM ground control station via the HMI device, while the ground operator monitors a plurality of ongoing missions of autonomous or semi-autonomous aerial vehicles from the ground and makes mission-specific decisions; providing, via a GUI widget displayed on the HMI device, a plurality of display prioritization options for identifying a different subset of the notification items for display in a notification item GUI window, the plurality of display prioritization options including a plurality of user-selectable display prioritization options wherein each user-selectable display prioritization option identifies a different subset of the plurality of notification items for display in the notification item GUI window; receiving selection via the GUI widget of a user-selected display prioritization option from the plurality of user-selectable display prioritization options; selecting a first set of notification items from the plurality of notification items for display based on the user-selected display prioritization option; and displaying the first set of notification items in the notification item GUI window on the HMI device.

In some aspects, the techniques described herein relate to a relational network in an airspace including a plurality of aerial vehicles in the airspace that include a plurality of manned aerial vehicles and a plurality of unmanned aircraft systems, an ATC service provider that provides air traffic control services for the plurality of manned aerial vehicles in the airspace, an Unmanned Aircraft System Traffic Management (UTM) service provider that provides traffic management services for the plurality of unmanned aircraft systems in the airspace, and a ground control station including: an HMI device having at least one display unit and at least one user input mechanism; and a controller for generating a graphical user interface (GUI) window for displaying notification items on the HMI device, wherein a notification item includes a message from an Unmanned Aircraft System Traffic Management (UTM) service provider, a UAM vehicle, an air traffic control (ATC) service provider, a vertiport, a fleet scheduler, an integrated map provider, or a weather service provider related to air travel in an airspace, the controller is configured to: receive a plurality of notification items for display to a ground operator at the UAM ground control station via the HMI device, while the ground operator monitors a plurality of ongoing missions of autonomous or semi-autonomous aerial vehicles from the ground and makes mission-specific decisions; provide, via a GUI widget displayed on the on the HMI device, a plurality of display prioritization options for identifying a different subset of the notification items for display in a notification item GUI window, the plurality of display prioritization options including a plurality of user-selectable display prioritization options wherein each user-selectable display prioritization option identifies a different subset of the plurality of notification items for display in the notification item GUI window; receive selection via the GUI widget of a user-selected display prioritization option from the plurality of user-selectable display prioritization options; select a first set of notification items from the plurality of notification items for display based on the user-selected display prioritization option; and cause the first set of notification items to be displayed in the notification item GUI window on the HMI device.

Furthermore, other desirable features and characteristics will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein:

FIGS. 3A, 3B, and 3C are diagrams depicting example notification item GUI windows for displaying notification items to an operator, in accordance with various embodiments;

FIGS. 4A and 4B provide example GUI widgets that a GCS controller can generate for display on the HMI device to allow a ground operator to choose a category of notification items to view, in accordance with various embodiments;

FIGS. 5A and 5B provide additional example GUI widgets that a GCS controller can generate for display on the HMI device to allow a ground operator to choose a category of notification items to view, in accordance with various embodiments;

DETAILED DESCRIPTION

The following detailed description is merely exemplary in nature and is not intended to limit the invention or the application and uses of the invention. As used herein, the words "exemplary" and "example" mean "serving as an example, instance, or illustration." Thus, any embodiment described herein as "exemplary" or "example" are not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
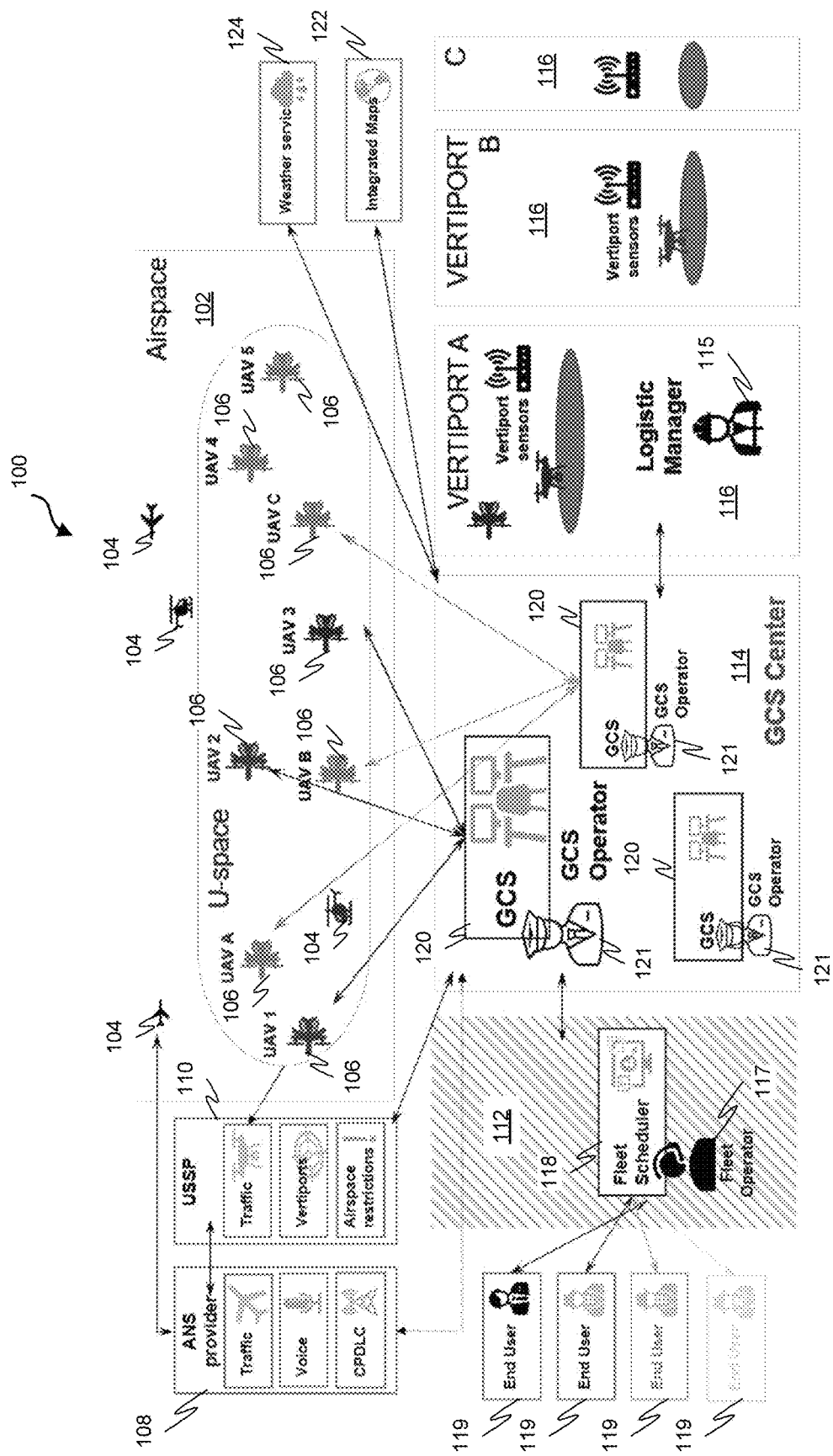
FIG. 1 is a block diagram depicting a role of an urban air mobility ground control station in an exemplary airspace network for a UAM system, in accordance with various embodiments.

An Urban Air Mobility (UAM) system is an aviation transportation system that uses highly automated aircraft that operate and transport passengers or cargo at lower altitudes within urban and suburban areas. FIG. 1 is a block diagram depicting an example airspace network 100 for a UAM system. The example airspace network 100 includes an airspace 102 that includes a plurality of aerial vehicles. The plurality of aerial vehicles in the airspace 102 includes a plurality of manned aerial vehicles 104 and a plurality of unmanned aircraft systems 106.

The example airspace network 100 further includes an ATC (air traffic control) service provider 108 that provides air traffic control services for the plurality of manned aerial vehicles 104 in the airspace, and an unmanned aircraft system traffic management (UTM) service provider 110 that provides traffic management services for the plurality of unmanned aircraft systems 106 in the airspace 102. The ATC (air traffic control) service provider 108 coordinates with the unmanned aircraft system traffic management (UTM) service provider 110. The example airspace network 100 also includes one or more fleet scheduler centers 112, one or more ground control station centers 114, and one or more vertiports 116.

A vertiport 116 is an area of land, water, or structure used or intended to be used for the landing and take-off of VTOL (Vertical Take-off and Landing) vehicles. A fleet scheduler center 112 includes fleet scheduler infrastructure 118 for a fleet operator 117. The fleet operator 117 is responsible for scheduling transportation for end users 119. A ground control station center 114 includes one or more ground control stations 120 for one or more ground control station operators 121. In a UAM environment, a ground operator 121 monitors multiple ongoing missions (e.g., delivery, cargo, air taxi, etc.) of autonomous or semi-autonomous vehicles (e.g., eVTOL (electric Vertical Take-off and Landing vehicle), VTOL (Vertical Take-off and Landing vehicle), UAV (Unmanned Aerial Vehicle), drones, etc.) from the ground and makes mission-specific decisions. The ground operator 121 uses a ground control station (GCS) 120 in the performance of its duties.

It is envisioned that the UAM could be operated in an airspace controlled by a UTM service provider 110, who will be responsible for traffic deconfliction and overall airspace management. But it is expected that the missions of UAM vehicles in the airspace will be managed by the ground operators 121, who is responsible for each vehicle under its supervision, the mission success, dispatch, surveillance, flight plan (FPLN) changes due to contingencies, etc. Therefore, a high-tech GCS 120 with an easy to use, easy to learn human-machine interface (HMI), which would effectively support a ground operator's tasks and decisions related to the UAM fleet management, can be helpful.

In support of its duties, the ground operator 121 receives notification items via the GCS 120 from many sources. Notification items are messages from sources such as a UAM vehicle 106, an ATC service provider 108, a UTM service provider 110, a fleet scheduler center 112, a logistic manager 115 at a vertiport 116, an integrated map provider 122, and a weather service provider 124 that may have an impact on how the ground operator 121 manages the missions of the UAM vehicle under its supervision. An example GCS 120 includes a set of tools, including hardware, software, and a human-machine interface, to support a ground operator 121 during fleet management and control. The GCS 120 forms a relational network with the plurality of UAM vehicles 106, ATC service provider 108, UTM service provider 110, fleet scheduler center 112, a vertiports 116, integrated map provider 122, and weather service provider 124 to receive notification items therefrom. As used herein the term "relational network" refers to any network in which the various constituents of the network work together to accomplish a purpose. Because of the potential for a large number of notification items to be directed to a ground operator 121 via a GCS 120, the example GCS 120 includes functionality that filters the notification items presented to the ground operator to prevent the ground operator 121 from being overwhelmed by information presented by the GCS 120.

Figure 2:
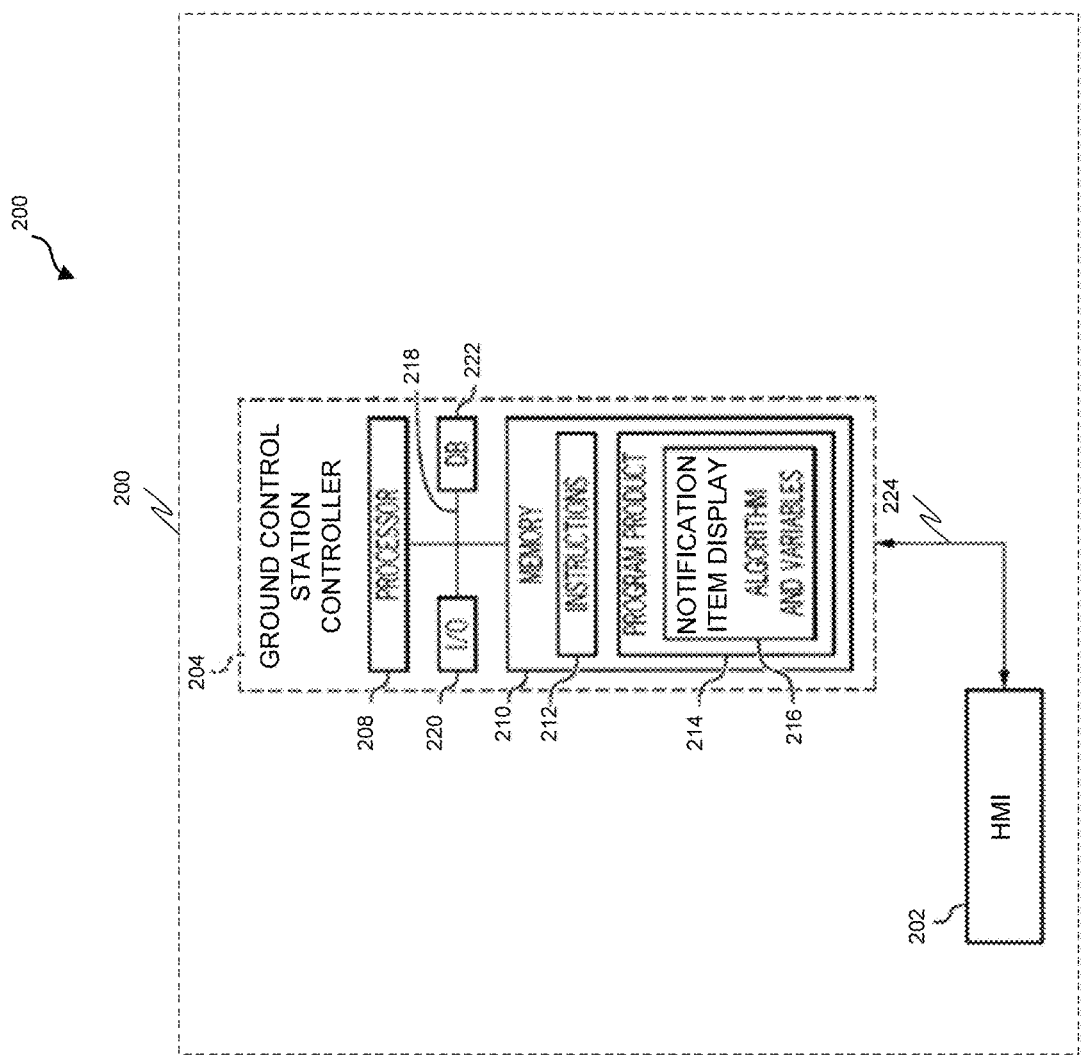
FIG. 2 is a block diagram depicting an example ground control station, in accordance with various embodiments.

FIG. 2 is a block diagram depicting an example ground control station 200 (e.g., GCS 120). The example ground control station 200 includes an HMI device 202 and a GCS controller 204. The HMI device 202 has at least one display unit and at least one user input mechanism. In various embodiments, the HMI device 202 includes a touchscreen device having at least one touchscreen display as a display unit and a touchscreen surface as a user input mechanism. In various embodiments, the HMI device 202 includes a mouse and/or keyboard as user input mechanisms.

The example GCS controller 204 includes a processing component comprising at least one processor 208 and a computer-readable storage device or media (such as memory 210) encoded with programming instructions for configuring the processing component. The processor 208 may comprise any type of processor or multiple processors, any custom-made or commercially available processor, a central processing unit (CPU), a graphics processing unit (GPU), an application specific integrated circuit (ASIC), a field programmable gate array (FPGA), an auxiliary processor among several processors associated with the processing component, a semiconductor-based microprocessor (in the form of a microchip or chip set), any combination thereof, or generally any device for executing instructions to carry out the described operations, tasks, and functions by manipulating electrical signals representing data bits at memory locations in system memory, as well as other processing of signals.

The computer readable storage device or media (e.g., memory 210) may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the processing component. The memory 210 may be located on and/or co-located on the same computer chip as the processor 208. Generally, the memory 210 maintains data bits and may be utilized by the processor 208 as storage and/or a scratch pad during operation. Specifically, the memory 210 stores instructions and applications 212. Information in the memory 210 may be organized and/or imported from an external source during an initialization step of a process; it may also be programmed via a user input device (e.g., associated with the HMI device 202). During operation, the processor 208 loads and executes one or more programs, algorithms and rules embodied as instructions and applications 212 contained within the memory 210 and, as such, controls the general operation of the GCS controller 204.

The memory 210 includes a novel program 216 that includes rules and instructions that, when executed, convert the processing component (e.g., processor 208/memory 210) configuration into the GCS controller 204, which is a novel GCS controller that performs the functions, techniques, and processing tasks associated with filtering notification items presented to the ground operator 121 to prevent the ground operator 121 from being overwhelmed by information presented by the GCS 200. The novel program 216 directs the processing of notification items to determine which notification items to display. The novel program 216 and associated stored variables may be stored in a functional form on computer readable media, for example, as depicted, in memory 210. While the depicted exemplary embodiment of the GCS controller is described in the context of a fully functioning computer system, those skilled in the art will recognize that the mechanisms of the present disclosure are capable of being distributed as a program product 214.

As a program product 214, one or more types of non-transitory computer-readable signal bearing media may be used to store and distribute the program 216, such as a non-transitory computer readable medium bearing the program 216 and containing therein additional computer instructions for causing a computer processor (such as the processor 208) to load and execute the program 216. Such a program product 214 may take a variety of forms, and the present disclosure applies equally regardless of the type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized as memory 210 in certain embodiments.

In various embodiments, the processing component (e.g., processor 208/memory 210) configuration of the GCS controller 204 may be communicatively coupled (via a bus 218) to an input/output (I/O) interface 220, and a database 222. The bus 218 serves to transmit programs, data, status and other information or signals between the various components of the GCS controller 204. The bus 218 can be any suitable physical or logical means of connecting computer systems and components. This includes, but is not limited to, direct hard-wired connections, fiber optics, infrared and wireless bus technologies.

The I/O interface 220 enables intra GCS controller communication, as well as communications between the GCS controller 204 and other system components, and between the GCS controller 204 and the external data sources via the communication system and fabric 224. The I/O interface 220 may include one or more network interfaces and can be implemented using any suitable method and apparatus. In various embodiments, the I/O interface 220 is configured to support communication from an external system driver and/or another computer system. In one embodiment, the I/O interface 220 is integrated with the communication system and fabric 224 and obtains data from external data source(s) directly. Also, in various embodiments, the I/O interface 220 may support communication with technicians, and/or one or more storage interfaces for direct connection to storage apparatuses, such as the database 222. In some embodiments, the database 222 is part of the memory 210. In various embodiments, the database 222 is integrated, either within the GCS controller 204 or external to it.

The example GCS controller 204 is configured to receive a plurality of notification items for display to a ground operator at a UAM ground control station via the HMI device 202, while the ground operator 121 monitors a plurality of ongoing missions of autonomous or semi-autonomous aerial vehicles 106 from the ground and makes mission-specific decisions. The example GCS controller 204 is configured to generate a graphical user interface (GUI) window for displaying the notification items on the HMI device 202. The notification items may include one or more of a message related to air travel in an airspace from an Unmanned Aircraft System Traffic Management (UTM) service provider 110, a UAM vehicle 106, an air traffic control (ATC) service provider 108, a vertiport 116, fleet scheduler infrastructure 118, an integrated map provider 122, a weather service provider 124, or others.

FIGS. 3A-3C are diagrams depicting example notification item GUI windows for displaying notification items to a ground operator 121. FIG. 3A depicts an example notification item GUI window 302 that includes a first pane 304 that indicates that the window 302 is for displaying notification items that require action, and that includes a second pane 306 for displaying the notification items requiring action. In this example, the notification item GUI window 302 has an empty second pane 306 indicating that no actions are required at the moment.

FIG. 3B depicts another example notification item GUI window 312 that includes a first pane 314 that indicates that the window 312 is for displaying notification items that require action, and that includes a second pane 316, a third pane 317, and a fourth pane 318 for displaying the notification items requiring action. Each notification item in the second pane 316, third pane 317, and fourth pane 318 includes a UAM vehicle symbol 321 and identifier 322, a reason (323) why action is needed, and an action button (324) to initiate an action. In various embodiments, the notification item GUI window 312 displays for each displayed notification item a graphical indicator that non-textually indicates a notification level of the notification item. In various embodiments, the graphical indicator that non-textually indicates is a color in which one or more of the UAM vehicle symbol 321, identifier 322, and reason (323) why action is needed is displayed.

FIG. 3C depicts portions of another example notification item GUI window 330 that lists twelve example notification items that may be included in a notification item GUI window. Each notification item includes a UAM vehicle symbol 331 and identifier 332, a reason (333) why action is needed, and an action button (334) to initiate an action. In various embodiments, the notification item GUI window 330 displays for each displayed notification item a graphical indicator that non-textually indicates a notification level of the notification item. In various embodiments, the graphical indicator that non-textually indicates is a color in which one or more of the UAM vehicle symbol 331, identifier 332, and reason (333) why action is needed is displayed.

The example GCS controller 204 is further configured to generate a GUI widget for display on the on the HMI device and provide, via the GUI widget displayed on the HMI device, a plurality of display prioritization options for identifying a particular subset of the notification items for display in a notification item GUI window. The plurality of display prioritization options includes an automatic display prioritization option and a plurality of user-selectable display prioritization options. Each user-selectable display prioritization option identifies a different subset of the plurality of notification items for display in the notification item GUI window.

Because of the number of different notifications, the number of different actions a ground operator may be required to execute, and the amount of simultaneously displayed information, a ground operator may become overwhelmed, especially if a GCS handles notifications for multiple UAVs in a dynamic environment. Not all of the notification items have the same criticality. The example GCS controller 204 uses the criticality of the notification items to provide a filtered list of notification items for display on the HMI device 202 so as to not overwhelm the ground operator 121 with less critical notifications.

Shown below in TABLE 1 is an example way in which the example GCS controller 204 can prioritize notification items to filter and present the notification items in a way that is less likely to overwhelm a ground operator.

TABLE 1

| Priority | Level of Importance | The action/notification item | Impact on Operator, safety, and mission |
|---|---|---|---|
| 1 | Critical | Emergency Landing | The operator needs to take an action immediately and support the UAV performing the emergency landing by analyzing the technical issues, cooperating with the emergency services, and landing areas. Impacts the safety and mission critically. |
| 2 | High | Reroute due to weather, reroute due to Resolution Advisory, detour due to closed vertiport, etc. | The operator needs to take an action as soon as possible not to make the situation worse or cause the emergency conditions. Without proper action, the UAV might fly into bad weather, fly into restricted geofence zone, deplete the energy without reaching the vertiport, etc.). Safety and mission can be compromised subsequently. |
| 3 | Medium | Optimize due to WX, Optimize due to TFR, etc. | The operator is not required to take an immediate action. These actions are proposed as a suggestion by the system to increase the efficiency/effectivity of the mission. There is not a subsequent impact on safety or mission if operator does not react. |
| 4 | Low or minimal | Acknowledgement of the communication restore, detour after RA, etc. | The operator is not required to take any action. This information has only informative, confirmative, or acknowledging character. There is not a subsequent impact on safety or mission if operator does not react. |

Table 1 categorizes notification items in one of four categories-Critical, High, Medium, and Low/minimum. The example GCS controller 204 provides two ways of using the categorization to choose which notification items to present to the ground operator 121. The example GCS controller 204 includes a manual operating mode and an automatic operating mode. In both modes, critical and highly important notification items are always presented to the ground operator 121. The medium and low/minimal notification items may be suppressed from viewing based on various conditions.

FIGS. 4A and 4B provide example GUI widgets (400, 420) that the example GCS controller 204 can generate for display on the HMI device 202 to allow a ground operator 121 to choose which category of notification items to view. Example GUI widget 400 provides a first checkbox widget 402 for selecting the automatic mode or the manual mode, a second checkbox widget 404 for selecting critical notification items for display, a third checkbox widget 406 for selecting high notification items for display, a fourth checkbox widget 408 for selecting medium notification items for display, and a fifth checkbox widget 410 for selecting low/marginal notification items for display. In this example, the critical and high checkbox widgets 404, 406 are selected. In various embodiments, selection of one of the critical checkbox widget 404 or the high checkbox widget 406 will automatically cause the other of these two widgets to also be selected. Selection of these two checkbox widgets result in the example GCS controller 204 generating a notification item GUI window that only displays notification items that are classified as critical or high notification items. This can be helpful when a ground operator 121 is managing the mission of several vehicles and the number of notification items are high.

Example GUI widget 420 provides a toggle (e.g., on/off) button widget 422 for selecting the automatic mode or the manual mode and a slider widget 424 for selecting critical notification and high notification items for display, medium notification items for display, or low/marginal notification items for display. In this example, the toggle button widget 422 is in the off position turning the automatic mode off, and the slider widget 424 is actuated to select the critical and high notification items for display. This configuration of the toggle button widget 422 and the slider widget 424 results in the example GCS controller 204 generating a notification item GUI window that only displays notification items that are classified as critical or high notification items. This can be helpful when a ground operator 121 is managing the mission of several vehicles and the number of notification items are high.

FIGS. 5A and 5B provide example GUI widgets (500, 520) that the example GCS controller 204 can generate for display on the HMI device 202 to allow a ground operator 121 to choose which category of notification items to view. Example GUI widget 500 provides a first checkbox widget 502 for selecting the automatic mode or the manual mode, a second checkbox widget 504 for selecting critical notification items for display, a third checkbox widget 506 for selecting high notification items for display, a fourth checkbox widget 508 for selecting medium notification items for display, and a fifth checkbox widget 510 for selecting low/marginal notification items for display. In this example, the critical, high, and medium checkbox widgets 504, 506, 508 are selected. In various embodiments, selection of the medium checkbox widget 508 will automatically cause the critical checkbox widget 504 and the high checkbox widget 506 to also be selected. Selection of these three checkbox widgets result in the example GCS controller 204 generating a notification item GUI window that only displays notification items that are classified as critical, high, or medium notification items. This allows a ground operator 121 to filter out some notification items.

Example GUI widget 520 provides a toggle (e.g., on/off) button widget 522 for selecting the automatic mode or the manual mode and a slider widget 524 for selecting critical notification and high notification items for display, medium notification items for display, or low/marginal notification items for display. In this example, the toggle button widget 522 is in the off position turning the automatic mode off, and the slider widget 524 is actuated to select the medium notification items for display. This configuration of the toggle button widget 522 and the slider widget 524 results in the example GCS controller 204 generating a notification item GUI window that only displays notification items that are classified as critical, high, or medium notification items. This allows a ground operator 121 to filter out some notification items.

Figure 6A:
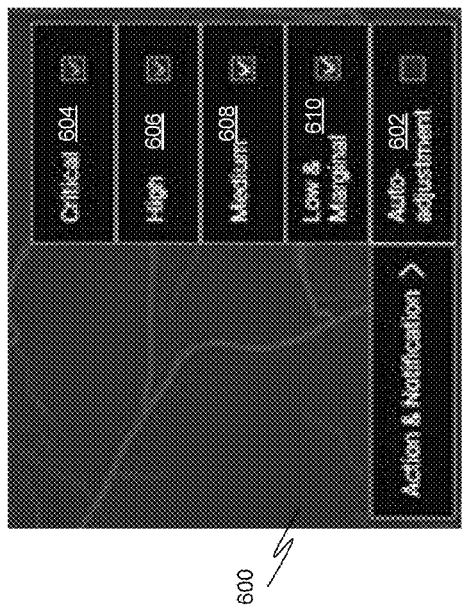
FIGS. 6A and 6B provide additional example GUI widgets that a GCS controller can generate for display on the HMI device to allow a ground operator to choose a category of notification items to view, in accordance with various embodiments.
Figure 6B:
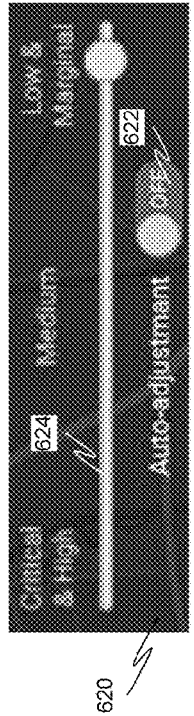

FIGS. 6A and 6B provide example GUI widgets (600, 620) that the example GCS controller 204 can generate for display on the HMI device 202 to allow a ground operator 121 to choose which category of notification items to view. Example GUI widget 600 provides a first checkbox widget 602 for selecting the automatic mode or the manual mode, a second checkbox widget 604 for selecting critical notification items for display, a third checkbox widget 606 for selecting high notification items for display, a fourth checkbox widget 608 for selecting medium notification items for display, and a fifth checkbox widget 610 for selecting low/marginal notification items for display. In this example, the critical, high, medium, and low/marginal checkbox widgets 604, 606, 608, 610 are selected. In various embodiments, selection of the low/marginal checkbox widget 610 will automatically cause the critical checkbox widget 604, the high checkbox widget 506, and the medium checkbox widget 608 to also be selected. Selection of these four checkbox widgets result in the example GCS controller 204 generating a notification item GUI window that displays all notification items.

Example GUI widget 620 provides a toggle (e.g., on/off) button widget 622 for selecting the automatic mode or the manual mode and a slider widget 624 for selecting critical notification and high notification items for display, medium notification items for display, or low/marginal notification items for display. In this example, the toggle button widget 622 is in the off position turning the automatic mode off, and the slider widget 624 is actuated to select the low/marginal notification items for display. This configuration of the toggle button widget 622 and the slider widget 624 results in the example GCS controller 204 generating a notification item GUI window that displays all notification items.

Figure 7A:
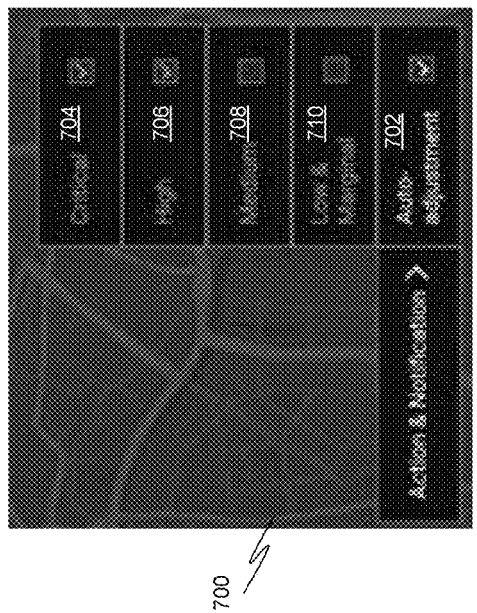
FIGS. 7A and 7B provide additional example GUI widgets that a GCS controller can generate for display on the HMI device to allow a ground operator to choose a category of notification items to view, in accordance with various embodiments.
Figure 7B:
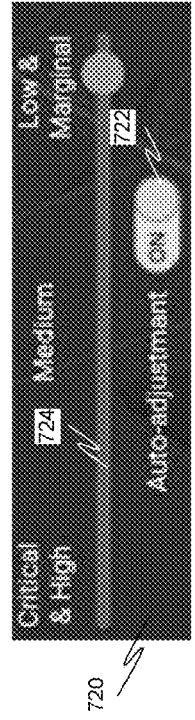

FIGS. 7A and 7B provide example GUI widgets (700, 720) that the example GCS controller 204 can generate for display on the HMI device 202 to allow a ground operator 121 to choose which category of notification items to view. Example GUI widget 700 provides a first checkbox widget 702 for selecting the automatic mode or the manual mode, a second checkbox widget 704 for selecting critical notification items for display, a third checkbox widget 706 for selecting high notification items for display, a fourth checkbox widget 708 for selecting medium notification items for display, and a fifth checkbox widget 710 for selecting low/marginal notification items for display. In this example, the first checkbox widget 702 is selected. In various embodiments, selection of the first checkbox widget 702 will automatically cause the critical checkbox widget 704 and the high checkbox widget 706 to also be selected. Selection of these three checkbox widgets results in the example GCS controller 204 generating a notification item GUI window that always displays the high and critical notification items and displays other notification items based on current conditions.

Example GUI widget 720 provides a toggle (e.g., on/off) button widget 722 for selecting the automatic mode or the manual mode and a slider widget 724 for selecting critical notification and high notification items for display, medium notification items for display, or low/marginal notification items for display. In this example, the toggle button widget 722 is in the on position turning the automatic mode on. This configuration of the toggle button widget 722 results in the example GCS controller 204 generating a notification item GUI window that always displays the high and critical notification items and displays other notification items based on current conditions.

The current conditions are defined by the quantity of UAVs being monitored and the number of notification items currently displayed in a progress of investigation and activation by the ground operator 121. The number of notification items currently displayed in a progress of investigation and activation by the ground operator 121, in various embodiments, include the quantity of active critical priority level notification items, the quantity of active high priority level notification items, the quantity of active medium priority level notification items, and the number of active low/marginal priority level notification items. In various embodiments, the operator experience level can be considered when determining notification items to display (e.g., more experienced ground operators 121 may get more notification items displayed). Table 2 below lists example logic that may be used by the example GCS controller 204 when deciding which notification items to display when in the automatic mode:

TABLE 2

| Number of UAV in the fleet | Required Actions and Notifications currently displayed | | | | Required Actions and Notifications to display |
|---|---|---|---|---|---|
| | Critical | High | Medium | Low & Marginal | |
| 1-3 | <1 | <1 | >0 | >0 | Show all |
| | >1 | >2 | >0 | >0 | Only Critical, High, and Medium |
| 4-6 | <1 | <1 | >0 | >0 | Show all |
| | >1 | >2 | >0 | >0 | Only Critical, High |
| 7-9 | <1 | <1 | >0 | >0 | Show all |
| | >1 | >2 | >0 | >0 | Only Critical, High |

The automatic and manual modes described above for adjusting the amount of notification items to display are merely examples and the disclosure is not limited to only these examples. In various embodiments, the two modes can be combined, modified, or enriched by other logic.

In various embodiments, the example GCS controller 204 is configured to receive selection via the GUI widget (e.g., GUI widget 400/420/500/520/600/620/700/720) of a display prioritization option (e.g., automatic mode or manual mode category) from the plurality of user-selectable display prioritization options, and select a first set of notification items from the plurality of notification items for display based on the user-selected display prioritization option. The example GCS controller 204 is further configured to cause the first set of notification items to be displayed in the notification item GUI window on the HMI device 202.

Figure 8:
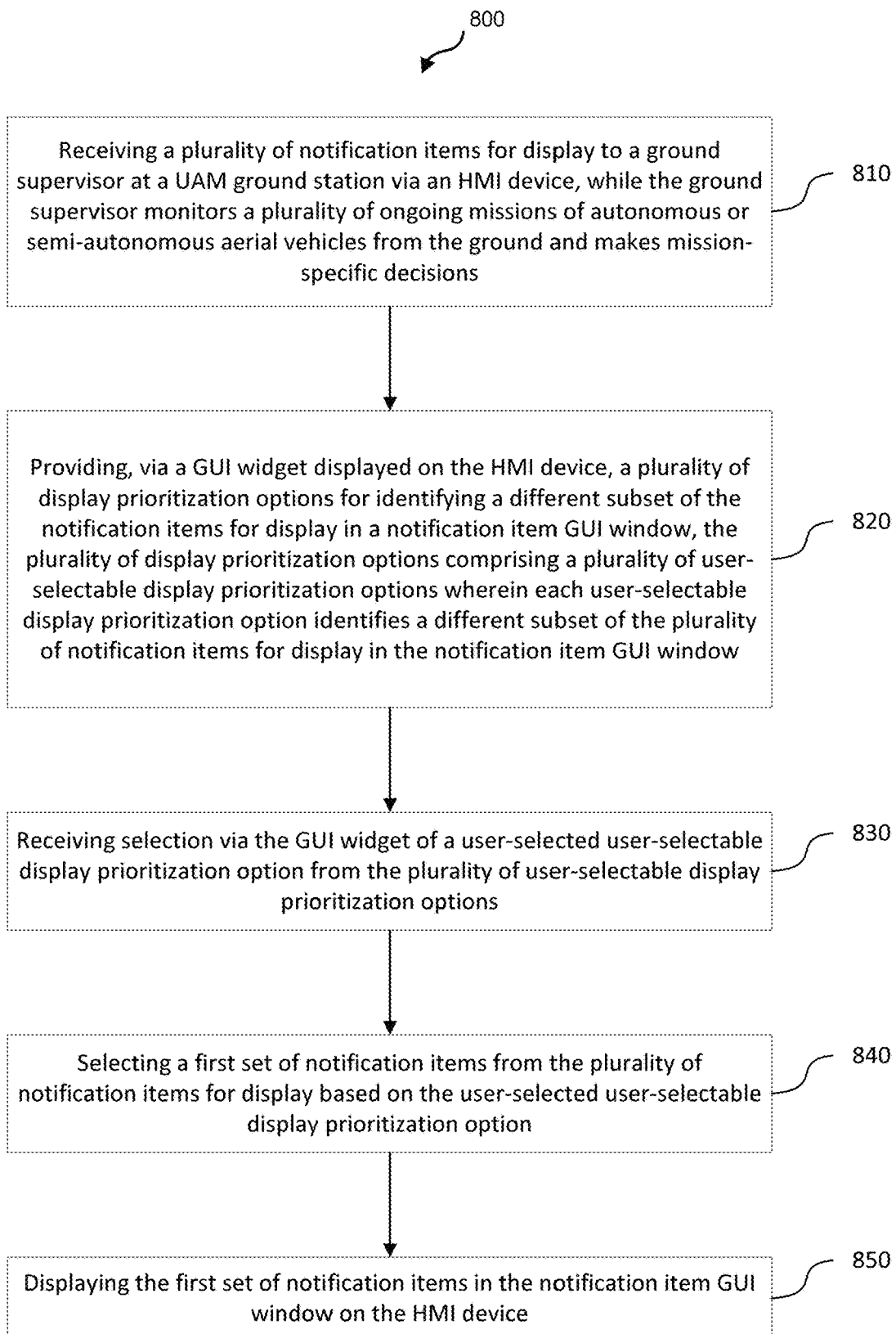
FIG. 8 is a flowchart of an example method in an airspace, in accordance with various embodiments.

FIG. 8 is a flowchart of an example method 800 in an airspace comprising a plurality of aerial vehicles in the airspace that comprise a plurality of manned aerial vehicles and a plurality of unmanned aircraft systems, an air traffic control (ATC) service provider that provides air traffic control services for the plurality of manned aerial vehicles in the airspace, an Unmanned Aircraft System Traffic Management (UTM) service provider that provides traffic management services for the plurality of unmanned aircraft systems in the airspace, and an Urban Air Mobility (UAM) ground control station comprising a human machine interface (HMI) device and a controller for generating a graphical user interface (GUI) window for displaying notification items on the HMI device, wherein a notification item comprises a message from the UTM service provider, a UAM vehicle, the ATC service provider, a vertiport, a fleet scheduler, an integrated map provider, or a weather service provider related to air travel in an airspace. The order of operation within the method 800 is not limited to the sequential execution as illustrated in the figure but may be performed in one or more varying orders as applicable and in accordance with the present disclosure.

At step 810, the example method 800 includes receiving a plurality of notification items for display to a ground operator at a UAM ground control station via the HMI device, while the ground operator monitors a plurality of ongoing missions of autonomous or semi-autonomous aerial vehicles from the ground and makes mission-specific decisions.

At step 820, the example method 800 includes providing, via a GUI widget displayed on the HMI device, a plurality of display prioritization options for identifying a different subset of the notification items for display in a notification item GUI window, the plurality of display prioritization options comprising a plurality of user-selectable display prioritization options wherein each user-selectable display prioritization option identifies a different subset of the plurality of notification items for display in the notification item GUI window.

At step 830, the example method 800 includes receiving selection via the GUI widget of a user-selected display prioritization option from the plurality of user-selectable display prioritization options.

At step 840, the example method 800 includes selecting a first set of notification items from the plurality of notification items for display based on the user-selected display prioritization option.

At step 850, the example method 800 includes displaying the first set of notification items in the notification item GUI window on the HMI device.

In some aspects, the techniques described herein relate to a notification item display system for an Urban Air Mobility (UAM) ground station, the system including: a human machine interface (HMI) device having at least one display unit and at least one user input mechanism; and a controller for generating a graphical user interface (GUI) window for displaying notification items on the HMI device, wherein a notification item includes a message from an Unmanned Aircraft System Traffic Management (UTM) service provider, a UAM vehicle, an air traffic control (ATC) service provider, a vertiport, a fleet scheduler, an integrated map provider, or a weather service provider related to air travel in an airspace, the controller is configured to: receive a plurality of notification items for display to a ground operator at a UAM ground control station via the HMI device, while the ground operator monitors a plurality of ongoing missions of autonomous or semi-autonomous aerial vehicles from the ground and makes mission-specific decisions; provide, via a GUI widget displayed on the HMI device, a plurality of display prioritization options for identifying a different subset of the notification items for display in a notification item GUI window, the plurality of display prioritization options including a plurality of user-selectable display prioritization options wherein each user-selectable display prioritization option identifies a different subset of the plurality of notification items for display in the notification item GUI window; receive selection via the GUI widget of a user-selected display prioritization option from the plurality of user-selectable display prioritization options; select a first set of notification items from the plurality of notification items for display based on the user-selected display prioritization option; and cause the first set of notification items to be displayed in the notification item GUI window on the HMI device.

In some aspects, the techniques described herein relate to a notification item display system, wherein the plurality of user-selectable display prioritization options includes a high priority display prioritization option, a medium priority display prioritization option, and an all display prioritization option.

In some aspects, the techniques described herein relate to a notification item display system, wherein: when the high priority display prioritization option is selected notification items having a critical or high priority level are displayed; when the medium priority display prioritization option is selected notification items having a critical, a high, or medium priority level are displayed; and when the all display prioritization option is selected all notification items are displayed regardless of priority level.

In some aspects, the techniques described herein relate to a notification item display system, wherein the plurality of display prioritization options further includes an automatic display prioritization option for automatically identifying a subset of the plurality of notification items for display in the notification item GUI window.

In some aspects, the techniques described herein relate to a notification item display system, wherein when the automatic display prioritization option is selected the controller automatically prioritizes notification items for display based on a plurality of factors including quantity of UAVs being monitored, quantity of active critical priority level notification items, quantity of active high priority level notification items, quantity of active medium priority level notification items, and number of active low/marginal priority level notification items, (and optionally seniority of a ground operator).

In some aspects, the techniques described herein relate to a notification item display system, wherein the notification item GUI window displays for each displayed notification item a graphical indicator that non-textually indicates a notification level of the notification item, a notification item description, and an action button that indicates an action to take to respond to the notification item.

In some aspects, the techniques described herein relate to a notification item display system, wherein the GUI widget includes a check box widget for each of the plurality of display prioritization options for use in selecting a display prioritization option.

In some aspects, the techniques described herein relate to a notification item display system, wherein the GUI widget includes one or more of a slider widget and an on-off button widget for use in selecting a display prioritization option.

In some aspects, the techniques described herein relate to a method in a relational network in an airspace including a plurality of aerial vehicles in the airspace that include a plurality of manned aerial vehicles and a plurality of unmanned aircraft systems, an air traffic control (ATC) service provider that provides air traffic control services for the plurality of manned aerial vehicles in the airspace, an Unmanned Aircraft System Traffic Management (UTM) service provider that provides traffic management services for the plurality of unmanned aircraft systems in the airspace through an Urban Air Mobility (UAM) ground control station that includes a human machine interface (HMI) device and a controller for generating a graphical user interface (GUI) window for displaying notification items on the HMI device, wherein a notification item includes a message from the UTM service provider, a UAM vehicle, the ATC service provider, a vertiport, a fleet scheduler, an integrated map provider, or a weather service provider related to air travel in an airspace, the method including: receiving a plurality of notification items for display to a ground operator at a UAM ground control station via the HMI device, while the ground operator monitors a plurality of ongoing missions of autonomous or semi-autonomous aerial vehicles from the ground and makes mission-specific decisions; providing, via a GUI widget displayed on the HMI device, a plurality of display prioritization options for identifying a different subset of the notification items for display in a notification item GUI window, the plurality of display prioritization options including a plurality of user-selectable display prioritization options wherein each user-selectable display prioritization option identifies a different subset of the plurality of notification items for display in the notification item GUI window; receiving selection via the GUI widget of a user-selected display prioritization option from the plurality of user-selectable display prioritization options; selecting a first set of notification items from the plurality of notification items for display based on the user-selected display prioritization option; and displaying the first set of notification items in the notification item GUI window on the HMI device.

In some aspects, the techniques described herein relate to a method, wherein the plurality of user-selectable display prioritization options includes a high priority display prioritization option, a medium priority display prioritization option, and an all display prioritization option.

In some aspects, the techniques described herein relate to a method, including: displaying notification items having a critical or high priority level, when the high priority display prioritization option is selected; displaying notification items having a critical, a high, or medium priority level, when the medium priority display prioritization option is selected; and displaying all notification items regardless of priority level, when the all display prioritization option is selected.

In some aspects, the techniques described herein relate to a method, wherein the plurality of display prioritization options further includes an automatic display prioritization option for automatically identifying a subset of the plurality of notification items for display in the notification item GUI window.

In some aspects, the techniques described herein relate to a method, further including automatically prioritizing notification items for display based on a plurality of factors including quantity of UAVs being monitored, quantity of active critical priority level notification items, quantity of active high priority level notification items, quantity of active medium priority level notification items, and number of active low/marginal priority level notification items, (and optionally seniority of a ground operator), when the automatic display prioritization option is selected.

In some aspects, the techniques described herein relate to a method, further including displaying in the notification item GUI window for each displayed notification item a graphical indicator that non-textually indicates a notification level of the notification item, a notification item description, and an action button that indicates an action to take to respond to the notification item.

In some aspects, the techniques described herein relate to a method, further including displaying in the GUI widget a check box widget for each of the plurality of display prioritization options for use in selecting a display prioritization option.

In some aspects, the techniques described herein relate to a method, further including displaying in the GUI widget one or more of a slider widget and an on-off button widget for use in selecting a display prioritization option.

In some aspects, the techniques described herein relate to a non-transitory computer-readable medium having stored thereon instructions that when executed by a processor cause the processor to perform a method in a relational network in an airspace including a plurality of aerial vehicles in the airspace that include a plurality of manned aerial vehicles and a plurality of unmanned aircraft systems, an air traffic control (ATC) service provider that provides air traffic control services for the plurality of manned aerial vehicles in the airspace, an Unmanned Aircraft System Traffic Management (UTM) service provider that provides traffic management services for the plurality of unmanned aircraft systems in the airspace through an Urban Air Mobility (UAM) ground control station that includes a human machine interface (HMI) device and a controller for generating a graphical user interface (GUI) window for displaying notification items on the HMI device, wherein a notification item includes a message from the UTM service provider, a UAM vehicle, the ATC service provider, a vertiport, a fleet scheduler, an integrated map provider, or a weather service provider related to air travel in an airspace, the method including: receiving a plurality of notification items for display to a ground operator at a UAM ground control station via the HMI device, while the ground operator monitors a plurality of ongoing missions of autonomous or semi-autonomous aerial vehicles from the ground and makes mission-specific decisions; providing, via a GUI widget displayed on the HMI device, a plurality of display prioritization options for identifying a different subset of the notification items for display in a notification item GUI window, the plurality of display prioritization options including a plurality of user-selectable display prioritization options wherein each user-selectable display prioritization option identifies a different subset of the plurality of notification items for display in the notification item GUI window; receiving selection via the GUI widget of a user-selected display prioritization option from the plurality of user-selectable display prioritization options; selecting a first set of notification items from the plurality of notification items for display based on the user-selected display prioritization option; and displaying the first set of notification items in the notification item GUI window on the HMI device.

In some aspects, the techniques described herein relate to a non-transitory computer readable medium, wherein the plurality of user-selectable display prioritization options includes a high priority display prioritization option, a medium priority display prioritization option, and an all display prioritization option, and the method further includes: displaying notification items having a critical or high priority level, when the high priority display prioritization option is selected; displaying notification items having a critical, a high, or medium priority level, when the medium priority display prioritization option is selected; and displaying all notification items regardless of priority level, when the all display prioritization option is selected.

In some aspects, the techniques described herein relate to a non-transitory computer readable medium, wherein the plurality of display prioritization options further includes an automatic display prioritization option for automatically identifying a subset of the plurality of notification items for display in the notification item GUI window, and the method further includes automatically prioritizing notification items for display based on a plurality of factors including quantity of UAVs being monitored, quantity of active critical priority level notification items, quantity of active high priority level notification items, quantity of active medium priority level notification items, and number of active low/marginal priority level notification items, (and optionally seniority of a ground operator), when the automatic display prioritization option is selected.

In some aspects, the techniques described herein relate to a non-transitory computer readable medium, further including displaying in the notification item GUI window for each displayed notification item a graphical indicator that non-textually indicates a notification level of the notification item, a notification item description, and an action button that indicates an action to take to respond to the notification item.

In some aspects, the techniques described herein relate to a relational network in an airspace including a plurality of aerial vehicles in the airspace that include a plurality of manned aerial vehicles and a plurality of unmanned aircraft systems, an ATC service provider that provides air traffic control services for the plurality of manned aerial vehicles in the airspace, an Unmanned Aircraft System Traffic Management (UTM) service provider that provides traffic management services for the plurality of unmanned aircraft systems in the airspace, and a ground control station including: an HMI device having at least one display unit and at least one user input mechanism; and a controller for generating a graphical user interface (GUI) window for displaying notification items on the HMI device, wherein a notification item includes a message from an Unmanned Aircraft System Traffic Management (UTM) service provider, a UAM vehicle, an air traffic control (ATC) service provider, a vertiport, a fleet scheduler, an integrated map provider, or a weather service provider related to air travel in an airspace, the controller is configured to: receive a plurality of notification items for display to a ground operator at the UAM ground control station via the HMI device, while the ground operator monitors a plurality of ongoing missions of autonomous or semi-autonomous aerial vehicles from the ground and makes mission-specific decisions; provide, via a GUI widget displayed on the on the HMI device, a plurality of display prioritization options for identifying a different subset of the notification items for display in a notification item GUI window, the plurality of display prioritization options including a plurality of user-selectable display prioritization options wherein each user-selectable display prioritization option identifies a different subset of the plurality of notification items for display in the notification item GUI window; receive selection via the GUI widget of a user-selected display prioritization option from the plurality of user-selectable display prioritization options; select a first set of notification items from the plurality of notification items for display based on the user-selected display prioritization option; and cause the first set of notification items to be displayed in the notification item GUI window on the HMI device.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A notification item display system for an Urban Air Mobility (UAM) ground station, the system comprising:
   a human machine interface (HMI) device having at least one display unit and at least one user input mechanism; and
   a controller for generating a graphical user interface (GUI) window for displaying notification items on the HMI device, the controller configured to:

receive a plurality of notification items for display to a ground operator at a UAM ground control station via the HMI device, while the ground operator monitors a plurality of ongoing missions of autonomous or semi-autonomous aerial vehicles from the ground and makes mission-specific decisions;

provide, via a GUI widget displayed on the HMI device, a plurality of display prioritization options for identifying a different subset of the notification items for display in a notification item GUI window, the plurality of display prioritization options comprising a plurality of user-selectable display prioritization options wherein each user-selectable display prioritization option identifies a different subset of the plurality of notification items for display in the notification item GUI window and wherein the plurality of user-selectable display prioritization options includes a high priority display prioritization option, a medium priority display prioritization option, and an all display prioritization option;

receive selection via the GUI widget of a user-selected display prioritization option from the plurality of user-selectable display prioritization options;

select a first set of notification items from the plurality of notification items for display based on the user-selected display prioritization option; and cause the first set of notification items to be displayed in the notification item GUI window on the HMI device, wherein:

when the high priority display prioritization option is selected notification items having a critical or high priority level are displayed;

when the medium priority display prioritization option is selected notification items having a critical, a high, or medium priority level are displayed; and when the all display prioritization option is selected all notification items are displayed regardless of priority level.

2. The notification item display system of claim 1, wherein a notification item comprises a message from an Unmanned Aircraft System Traffic Management (UTM) service provider, a UAM vehicle, an air traffic control (ATC) service provider, a vertiport, a fleet scheduler, an integrated map provider, or a weather service provider related to air travel in an airspace.

3. The notification item display system of claim 1, wherein the plurality of display prioritization options further comprises an automatic display prioritization option for automatically identifying a subset of the plurality of notification items for display in the notification item GUI window.

4. The notification item display system of claim 3, wherein when the automatic display prioritization option is selected the controller automatically prioritizes notification items for display based on a plurality of factors including quantity of UAVs being monitored, quantity of active critical priority level notification items, quantity of active high priority level notification items, quantity of active medium priority level notification items, and number of active low/marginal priority level notification items.

5. The notification item display system of claim 1, wherein the notification item GUI window displays for each displayed notification item a graphical indicator that non-textually indicates a notification level of the notification item, a notification item description, and an action button that indicates an action to take to respond to the notification item.

6. The notification item display system of claim 1, wherein the GUI widget includes a check box widget for each of the plurality of display prioritization options for use in selecting a display prioritization option.

7. The notification item display system of claim 1, wherein the GUI widget includes one or more of a slider widget and an on-off button widget for use in selecting a display prioritization option.

8. A method in a relational network in an airspace comprising a plurality of aerial vehicles in the airspace that comprise a plurality of manned aerial vehicles and a plurality of unmanned aircraft systems, an air traffic control (ATC) service provider that provides air traffic control services for the plurality of manned aerial vehicles in the airspace, an Unmanned Aircraft System Traffic Management (UTM) service provider that provides traffic management services for the plurality of unmanned aircraft systems in the airspace through an Urban Air Mobility (UAM) ground control station comprising a human machine interface (HMI) device and a controller for generating a graphical user interface (GUI) window for displaying notification items on the HMI device, the method comprising:

receiving a plurality of notification items for display to a ground operator at a UAM ground control station via the HMI device, while the ground operator monitors a plurality of ongoing missions of autonomous or semi-autonomous aerial vehicles from the ground and makes mission-specific decisions;

providing, via a GUI widget displayed on the HMI device, a plurality of display prioritization options for identifying a different subset of the notification items for display in a notification item GUI window, the plurality of display prioritization options comprising a plurality of user-selectable display prioritization options wherein each user-selectable display prioritization option identifies a different subset of the plurality of notification items for display in the notification item GUI window and wherein the plurality of user-selectable display prioritization options includes a high priority display prioritization option, a medium priority display prioritization option, and an all display prioritization option;

receiving selection via the GUI widget of a user-selected display prioritization option from the plurality of user-selectable display prioritization options;

selecting a first set of notification items from the plurality of notification items for display based on the user-selected display prioritization option; and displaying the first set of notification items in the notification item GUI window on the HMI device, the displaying comprising:

displaying notification items having a critical or high priority level, when the high priority display prioritization option is selected;

displaying notification items having a critical, a high, or medium priority level, when the medium priority display prioritization option is selected; and displaying all notification items regardless of priority level, when the all display prioritization option is selected.

9. The method of claim 8, wherein a notification item comprises a message from the UTM service provider, a UAM vehicle, the ATC service provider, a vertiport, a fleet scheduler, an integrated map provider, or a weather service provider related to air travel in an airspace.

10. The method of claim 8, wherein the plurality of display prioritization options further comprises an automatic display prioritization option for automatically identifying a subset of the plurality of notification items for display in the notification item GUI window.

11. The method of claim 10, further comprising automatically prioritizing notification items for display based on a plurality of factors including quantity of UAVs being monitored, quantity of active critical priority level notification items, quantity of active high priority level notification items, quantity of active medium priority level notification items, and number of active low/marginal priority level notification items, when the automatic display prioritization option is selected.

12. The method of claim 8, further comprising displaying in the notification item GUI window for each displayed notification item a graphical indicator that non-textually indicates a notification level of the notification item, a notification item description, and an action button that indicates an action to take to respond to the notification item.

13. The method of claim 8, further comprising displaying in the GUI widget a check box widget for each of the plurality of display prioritization options for use in selecting a display prioritization option.

14. The method of claim 8, further comprising displaying in the GUI widget one or more of a slider widget and an on-off button widget for use in selecting a display prioritization option.

15. A non-transitory computer readable medium having stored thereon instructions that when executed by a processor cause the processor to perform a method in a relational network in an airspace comprising a plurality of aerial vehicles in the airspace that comprise a plurality of manned aerial vehicles and a plurality of unmanned aircraft systems, an air traffic control (ATC) service provider that provides air traffic control services for the plurality of manned aerial vehicles in the airspace, an Unmanned Aircraft System Traffic Management (UTM) service provider that provides traffic management services for the plurality of unmanned aircraft systems in the airspace through an Urban Air Mobility (UAM) ground control station comprising a human machine interface (HMI) device and a controller for generating a graphical user interface (GUI) window for displaying notification items on the HMI device, the method comprising:

receiving a plurality of notification items for display to a ground operator at a UAM ground control station via the HMI device, while the ground operator monitors a plurality of ongoing missions of autonomous or semi-autonomous aerial vehicles from the ground and makes mission-specific decisions;

providing, via a GUI widget displayed on the HMI device, a plurality of display prioritization options for identifying a different subset of the notification items for display in a notification item GUI window, the plurality of display prioritization options comprising a plurality of user-selectable display prioritization options wherein each user-selectable display prioritization option identifies a different subset of the plurality of notification items for display in the notification item GUI window and wherein the plurality of user-selectable display prioritization options includes a high priority display prioritization option, a medium priority display prioritization option, and an all display prioritization option;

receiving selection via the GUI widget of a user-selected display prioritization option from the plurality of user-selectable display prioritization options;

selecting a first set of notification items from the plurality of notification items for display based on the user-selected display prioritization option; and displaying the first set of notification items in the notification item GUI window on the HMI device, the displaying comprising:

displaying notification items having a critical or high priority level, when the high priority display prioritization option is selected;

displaying notification items having a critical, a high, or medium priority level, when the medium priority display prioritization option is selected; and displaying all notification items regardless of priority level, when the all display prioritization option is selected.

16. The non-transitory computer readable medium of claim 15, wherein a notification item comprises a message from the UTM service provider, a UAM vehicle, the ATC service provider, a vertiport, a fleet scheduler, an integrated map provider, or a weather service provider related to air travel in an airspace.

17. The non-transitory computer readable medium of claim 16, wherein the plurality of display prioritization options further comprises an automatic display prioritization option for automatically identifying a subset of the plurality of notification items for display in the notification item GUI window, and the method further comprises automatically prioritizing notification items for display based on a plurality of factors including quantity of UAVs being monitored, quantity of active critical priority level notification items, quantity of active high priority level notification items, quantity of active medium priority level notification items, and number of active low/marginal priority level notification items, when the automatic display prioritization option is selected.

18. The non-transitory computer readable medium of claim 15, wherein the method further comprises displaying in the notification item GUI window for each displayed notification item a graphical indicator that non-textually indicates a notification level of the notification item, a notification item description, and an action button that indicates an action to take to respond to the notification item.

19. The non-transitory computer readable medium of claim 15, wherein the method further comprises displaying in the GUI widget a check box widget for each of the plurality of display prioritization options for use in selecting a display prioritization option.

20. The non-transitory computer readable medium of claim 15, wherein the method further comprises displaying in the GUI widget one or more of a slider widget and an on-off button widget for use in selecting a display prioritization option.

* * * * *